US006947551B2

(12) United States Patent
Givens

(10) Patent No.: US 6,947,551 B2
(45) Date of Patent: Sep. 20, 2005

(54) APPARATUS AND METHOD OF TIME DELAY ESTIMATION

(75) Inventor: Maurice Givens, Chicago, IL (US)

(73) Assignee: Tellabs Operations, Inc., Naperville, IL (US)

( * ) Notice: Subject to any disclaimer, the term of this patent is extended or adjusted under 35 U.S.C. 154(b) by 708 days.

(21) Appl. No.: 09/821,707

(22) Filed: Mar. 26, 2001

(65) Prior Publication Data

US 2002/0164014 A1 Nov. 7, 2002

(51) Int. Cl.[7] .................................................. H04M 1/00

(52) U.S. Cl. ............................ 379/406.06; 379/406.08; 379/406.01

(58) Field of Search ....................... 379/406.01, 406.06, 379/406.08, 406.02

(56) References Cited

U.S. PATENT DOCUMENTS 6,625,279 B1 * 9/2003 Eom ..................... 379/406.01

* cited by examiner

*Primary Examiner*—Jefferey F. Harold
(74) *Attorney, Agent, or Firm*—Hamilton, Brook, Smith & Reynolds, P.C.

(57) ABSTRACT

An apparatus and method for estimating a time delay between two signals are provided. An original signal and a delayed signal are provided to an average magnitude difference processor for determining an average magnitude difference for a sum of samples representing an envelope of each of the respective original and delayed signals, each for a series of sample delays. The time delay between the two signals is determined as the sample delay which minimizes the average magnitude difference.

4 Claims, 2 Drawing Sheets

APPARATUS AND METHOD OF TIME DELAY ESTIMATION

FIELD OF THE INVENTION

The present invention relates generally to a method and apparatus for measuring delay in telecommunications signals and is particularly suited to determining echo path delay for use with echo cancellers.

BACKGROUND

Echo cancellers for use in telecommunication systems operate by developing a model for the echo path impulse response, and then convolving the modeled response with an incoming signal in order to produce an estimated echo signal. The estimated echo signal is then subtracted from an outbound signal from the echo path in order to eliminate echo. A critical parameter required to be determined is the time delay of the echo path. For rapid convergance of the echo canceller, it is desirable for the time delay to be determined sufficiently accurately with minimal computational complexity.

SUMMARY

A time delay estimation system is provided for use with telecommunications systems to provide an estimate of signal delay. The time delay estimate system, according to a first embodiment, computes an average magnitude difference between energy envelope estimates of an original signal and a delayed signal. The time delay is determined according to a minimum in the average magnitude difference between the original and delayed signals.

An absolute value generator receives an original signal and a delayed version of the original signal. The absolute value generator produces output signals representing the absolute value of the original signal and the delayed signal. A low pass filter is connected to the absolute value generator and receives the output signals from the absolute value generator. For each signal so received, the low pass filter substantially removes frequency components above a preselected frequency threshold to yield an estimate of the signal envelope. In that way, the low pass filter outputs an signal envelope estimate of the absolute value of the original signal and the delayed signal. To reduce computational requirements, a sample reduction device such as a decimation filter receives the filtered original and delayed signals to provide signals having a reduced sampling rate. A first buffer is connected to the sample reduction device and receives and stores the reduced original signal. A second buffer is connected to the sample reduction device and receives and stores the reduced delayed signal. Each buffer is connected to a difference processor which uses the information stored in the buffers to determine a series of differences between the buffered signals in order to determine an index producing a minimum difference. The time delay corresponding to the determined index then corresponds to the time delay between the original signal and the delayed signal.

In a second embodiment, the difference processor is replace by a correlation processor. Both embodiments benefit from the robustness to noise design of the overall invention and the reduced computational complexity afforded by the data reduction.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION

Figure 1:
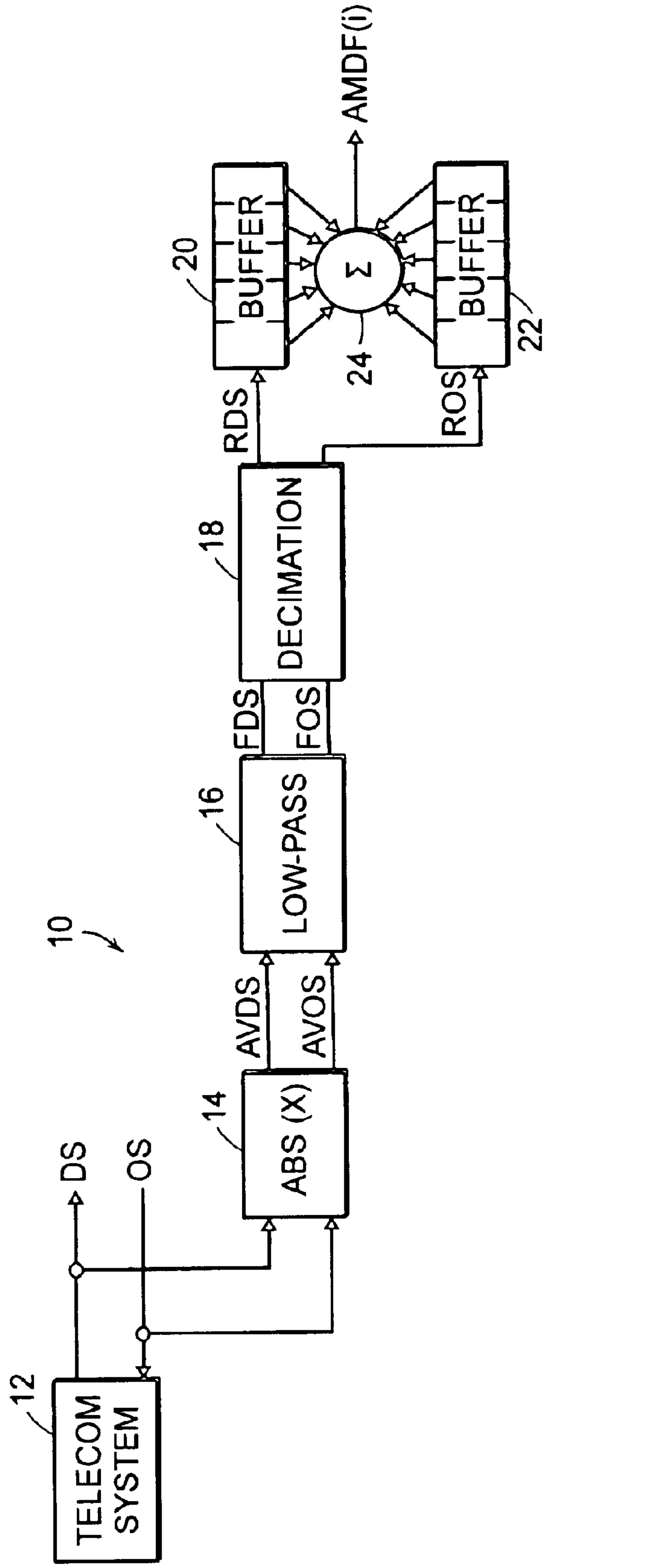
FIG. 1 is a functional block diagram showing a first embodiment of the delay estimation system of the present invention.
Figure 2:
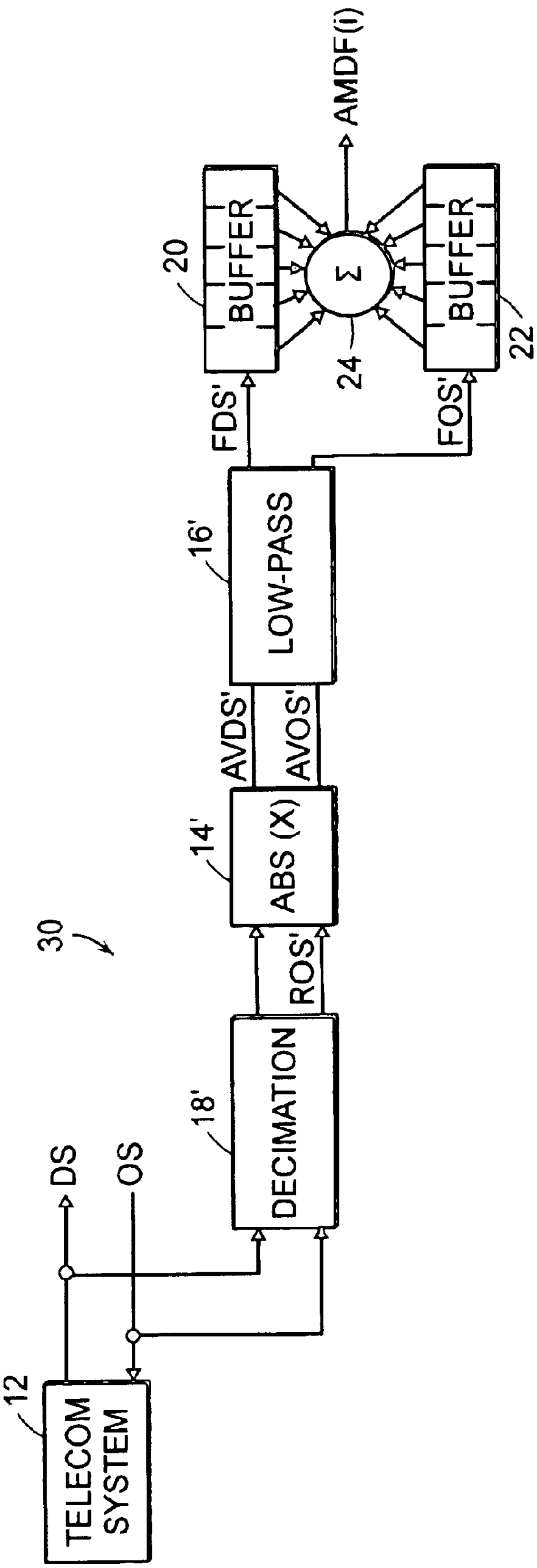
FIG. 2 is a functional block diagram showing a second embodiment of the delay estimation system of the present invention.

Referring now to the drawings, wherein like numerals indicate like elements, FIGS. 1 and 2 illustrate two embodiments of a delay estimation system 10, 30 for estimating the delay introduced into a signal by a telecommunication system 12. The telecommunication system 12 receives an original signal OS and produces a delayed signal DS. Examples of telecommunications 12 may include any telecommunication system having an echo path causing such a delay between OS and DS. The delay estimation systems 10 includes an absolute value generator 14, a low pass filter 16, a decimation filter 18, two buffers 20, 22, and a difference processor 24.

The absolute value generator 14 receives the delayed signal DS and original signal OS, and produces an absolute value signal AVDS of the delayed signal and an absolute value signal AVOS of the original signal. These absolute value signals provide an estimate of the energy of each signal. A low pass filter 16 is connected to the absolute value generator 14 for receiving the AVDS signal and the AVOS signal. The frequency response characteristic of the low pass filter 16 is designed to substantially attenuate, or reject, a range of frequency components above a selected frequency. The low pass filter 16 alters the absolute value of the delayed AVDS to provide a filtered delayed signal FDS, which represents an estimate of the energy envelope of the AVDS signal. Likewise, the low pass filter is applied to the absolute value of the original signal AVOS and provides a filtered original signal FOS representative of the energy envelope of the AVOS signal. It is preferable to remove high frequency components to provide anti-aliasing for the decimation filter 18. Accordingly, the selected frequency is chosen with regard to the sampling rate of the sample reduction device 18.

The decimation filter 18 is connected to the low pass filter 16 and receives the filtered delayed signal FDS and the filtered original signal FOS. The decimation filter 18 reduces the sampling rate of the filtered delayed signal FDS and the filtered original signal FOS, providing a reduced delayed signal RDS and reduced original signal ROS, respectively. The decimation filter 18 thereby reduces the computational requirements encountered in subsequent processing. The decimation filter 18 reduces the sampling rate by arbitrary factor M. Consequently, the decimation function reduces the subsequent computation requirements by a factor of M. The reduced delayed signal RDS is stored in a first buffer 20, and the reduced original signal ROS is stored in a second buffer 22, each buffer being connected to a respective output of the sample reduction device 18. Each buffer stores a preselected number of samples, N. A continual estimate of the time delay can be obtained by removing the oldest sample from each buffer and adding a new sample to each buffer. Alternately, the entire buffer contents, may be periodically refreshed with new samples.

A difference processor 24 is connected to receive the data stored in the first buffer 20 and the second buffer 22. The difference processor 24 performs an average magnitude difference calculation (AMDF) according to the following formula:

$$AMDF(i) = \frac{1}{N}\sum_{n=0}^{N-1}|x_1(n) - x_2(n+i)| \tag{1}$$

where N is the number of samples stored in each buffer 20, 22, $x_1(n)$ are the elements of the second buffer 22, $x_2(n)$ are the elements of the first buffer 20, and i represents a temporal shift between the data in two buffers 20, 22. For each value of i, the AMDF function returns a value representing the sum of the absolute value of the differences between the data of shifted first buffer 20, $x_2$, and the second buffer 22, $x_1$. Optionally, the AMDF may be computed without dividing the sum by N. Thus, the AMDF reduces the computation requirements by eliminating multiplications.

The value of the shift, i', yielding the smallest value of the AMDF represents an estimate of the delay between the original signal OS and the delayed signal DS. Specifically, the delay introduced by telecommunication system 12 creates a commensurate offset between the data stored in the two buffers 20, 22. If the delay were to correspond to a precise integral value of i, i', the AMDF (i') would have a value of 0. However, the delay introduced to the delayed signal DS may not equate to a integral value of i, and the minimum value of the AMDF would be greater than 0. In this case, the value of i' minimizing the AMDF would provide an estimate of the delay between the original signal OS and the delayed signal DS. For larger values of the data reduction factor M, and thus fewer samples present in the buffers 20, 22, the larger the discrepancy is apt to be between the estimated delay time determined by the delay estimation device 24 and the true delay time. Specifically, the time delay may be estimated by:

$$td=(1/fs)M\ i', \tag{2}$$

where td is the delay time, fs is the sampling rate, M the data reduction factor, and i' value that minimizes the AMDF. For example, for fs=8000 samples per second, M=8, if the minimal value of the AMDF occurs when i'=4, the time delay is estimated to be 4 msec. This is termed the full bandwidth average magnitude difference.

In another preferred embodiment of the AMDF, the computation requirements are further reduced by using a subset (window) of the reduced signal stored in the two buffers 20, 22. In this form the windowed AMDF is computed as $$AMDF(i) = \frac{1}{B}\sum_{n=0}^{B-1}|x_1(n) - x_2(n+i)| \tag{3}$$

where B is less than N and represents the length of the window. Computation of the estimated delay for the windowed AMDF is performed in a manner analogous to the full bandwidth AMDF discussed above.

In an alternative embodiment, the difference processor 24 may be replaced by a correlation processor to calculate a correlation function:

$$R(i) = \frac{1}{N}\sum_{n=0}^{N-1}x_1(n)x_2(n+i) \tag{4}$$

where the variables have the same meaning as discussed above in connection with the AMDF. The time delay is estimated by a maximum value of the correlation function. Once the value of i' is determined that maximizes the value of the correlation function, computation of the time delay is given by equation (2) above. In addition, a windowing scheme may be applied to the correlation function in a similar manner to the windowed AMDF:

$$R(i) = \frac{1}{B}\sum_{n=0}^{B-1}x_1(n)x_2(n+i) \tag{5}$$

where B is less than N and represents the length of the window.

Further reduction in the computational requirements may be achieved by applying the decimation filter at an earlier stage in the time delay estimation process, as shown by the delay estimation device 30 in FIG. 2. The delay estimation system 30 includes a decimation filter 18' for receiving the delayed signal DS and original signal OS. The decimation filter 18' reduces the sampling rate of the delayed signal DS and the original signal OS, providing a reduced delayed signal RDS' and reduced original signal ROS', respectively. The decimation filter 18' thereby reduces the computational requirements encountered in subsequent processing.

The reduced signals RDS' and ROS' are altered by an absolute value generator 14' to produce the absolute value of the reduced delayed signal AVDS' and an absolute value of the reduced original signal AVOS', respectively. A low pass filter 16' is connected to the absolute value generator 14' for receiving the AVDS' signal and the AVOS' signal. The frequency response characteristic of low pass filter 16' is designed to substantially attenuate, or reject, a range of frequency components above a selected frequency. The low pass filter 16' provides a filtered delayed signal FDS' and a filtered original signal FOS', which represent estimates of the envelopes of the AVDS' signal and AVOS' signal, respectively. Since sample reduction has already been preformed by the decimation filter 18', choice of the selected frequency may be made without concern of aliasing by the decimation filter 18'.

The filtered delayed signal FDS' is stored in a first buffer 20, and the filtered original signal FOS' is stored in a second buffer 22, each buffer being connected to a respective output of the low pass filter 16'. Each buffer 20, 22 stores a preselected number of samples, N.

A difference processor 24 receives the data stored in the first buffer 20 and the second buffer 22. The difference processor 24 may comprise an average magnitude difference function (AMDF) or may be replaced by a correlation processor as discussed above in connection with FIG. 1. In addition, the windowing techniques for the AMDF and correlation function may be applied to the delay estimation device 30.

It will be recognized by those skilled in the art that changes or modifications may be made to the above-described embodiments without departing from the broad inventive concepts of the invention. For example, the original signal may be an impulse, so that the output of the difference processor 24 provides an estimate of the delay time assisted with the impulse response function of the telecommunication system 12. It should therefore be understood that this invention is not limited to the particular embodiments described herein, but is intended to include all changes and modifications that are within the scope and spirit of the invention as set forth in the claims.

What is claimed is:

1. A method of processing telecommunications signals comprising the steps of:

transforming an original signal to produce an absolute value of the original signal;

transforming a delayed signal to produce an absolute value of the delayed signal;

applying a low pass filter to the absolute value of the original signal to provide an original-signal envelope estimate;

applying a low pass filter to the absolute value of the delayed signal to provide a delayed-signal envelope estimate; and applying a delay estimation function to the original-signal envelope estimate and the delayed-signal estimate to provide an estimate of the delay between the original signal and the delayed signal;

wherein the delay estimation function comprises an average magnitude difference function.

2. A method of processing telecommunications signals comprising the steps of:

transforming an original signal to produce an absolute value of the original signal;

transforming a delayed signal to produce an absolute value of the delayed signal; applying a low pass filter to the absolute value of the original signal to provide an original-signal envelope estimate;

applying a low pass filter to the absolute value of the delayed signal to provide a delayed-signal envelope estimate; applying a delay estimation function to the original-signal envelope estimate and delayed-signal envelope estimate to provide an estimate of the delay between the original signal and the delayed signal;

wherein the delay estimation function comprises an average magnitude difference function.

3. An apparatus for estimating a delay in a telecommunication signal comprising:

an absolute value generator for producing an absolute value of an original signal and an absolute value of a delayed signal;

a filter means connected with the absolute value generator for altering the absolute value of the original and the delayed signals to provide an estimate of the original-signal envelope and the delayed-signal envelope; and a delay estimation means for receiving the signal envelopes and for estimating the delay between the original signal and the delayed signal from the reduced original-signal envelope and the reduced delayed-signal envelope; and a sample reduction means connected with the filter means for reducing the sampling rate of the signal envelope estimates to provide a reduced original-signal envelope estimate and a reduced delayed-signal envelope estimate;

wherein the delay estimation means comprises an average magnitude difference function.

4. An apparatus for estimating a delay in a telecommunication signal comprising:

a sample reduction means for reducing the sampling rate of an original signal and a delayed signal;

an absolute value generator connected with the sample reduction means for producing an absolute value of the reduced original signal and an absolute value of the reduced delayed signal;

a filter means connected with the absolute value generator for altering the absolute value of the reduced original signal and the reduced delayed signal to provide an estimate of the original-signal envelope and the delayed-signal envelope; and a delay estimation means for receiving the signal envelopes and for estimating the delay between the original signal and the delayed signal from the original-signal envelope estimate and the delayed-signal envelope estimate;

wherein the delay estimation means comprises an average magnitude difference function.

* * * * *